United States Patent
Braford, Jr.

(10) Patent No.: US 7,534,171 B2
(45) Date of Patent: May 19, 2009

(54) SPLINE CONNECTOR

(75) Inventor: Thomas E. Braford, Jr., Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/805,730

(22) Filed: May 24, 2007

(65) Prior Publication Data

US 2007/0281518 A1 Dec. 6, 2007

Related U.S. Application Data

(60) Provisional application No. 60/809,781, filed on May 30, 2006.

(51) Int. Cl.
*F16D 3/00* (2006.01)

(52) U.S. Cl. .......................................................... 464/74

(58) Field of Classification Search ............... 310/75 D, 310/75 R; 74/411, 82; 464/73, 74, 76, 81–83, 464/92

See application file for complete search history.

(56) References Cited

U.S. PATENT DOCUMENTS

| | | | |
|---|---|---|---|
| 1,803,995 A | | 5/1931 | Roland |
| 2,413,810 A | * | 1/1947 | Carlson .................... 192/70.14 |
| 2,625,415 A | | 1/1953 | Smith |
| 4,875,796 A | | 10/1989 | Storm |
| 5,564,981 A | | 10/1996 | Iwabuchi et al. |
| 5,674,026 A | | 10/1997 | Ishibashi |
| 5,810,668 A | * | 9/1998 | Graham et al. ................. 464/81 |
| 6,169,346 B1 | * | 1/2001 | Nakamura et al. ......... 310/75 D |
| 6,257,798 B1 | | 7/2001 | Wormsbaecher |
| 6,425,837 B1 | * | 7/2002 | Ochiai .......................... 474/70 |
| 6,932,729 B2 | * | 8/2005 | Ochiai .......................... 474/74 |
| 7,153,228 B2 | * | 12/2006 | Fujiu et al. .................... 474/70 |
| 2003/0083136 A1 | | 5/2003 | Park |
| 2005/0192103 A1 | | 9/2005 | Hauck |

FOREIGN PATENT DOCUMENTS

| | | |
|---|---|---|
| BE | 535 319 | 12/1958 |
| DE | 12 67 480 | 5/1968 |
| FR | 878 126 | 1/1943 |
| GB | 159 580 | 2/1921 |
| GB | 276 000 | 5/1928 |
| GB | 307 921 | 10/1929 |

* cited by examiner

*Primary Examiner*—Jean F Duverne
(74) *Attorney, Agent, or Firm*—Warn Partners, P.C.

(57) ABSTRACT

A spline connector is provided which includes a first spline connector member. A second spline connector member is provided having backlash between spline teeth of the spline connector members. A spring is provided which biases the teeth of the spline connector members to engage with one another to counter separation resultant from negative torque oscillations.

13 Claims, 10 Drawing Sheets

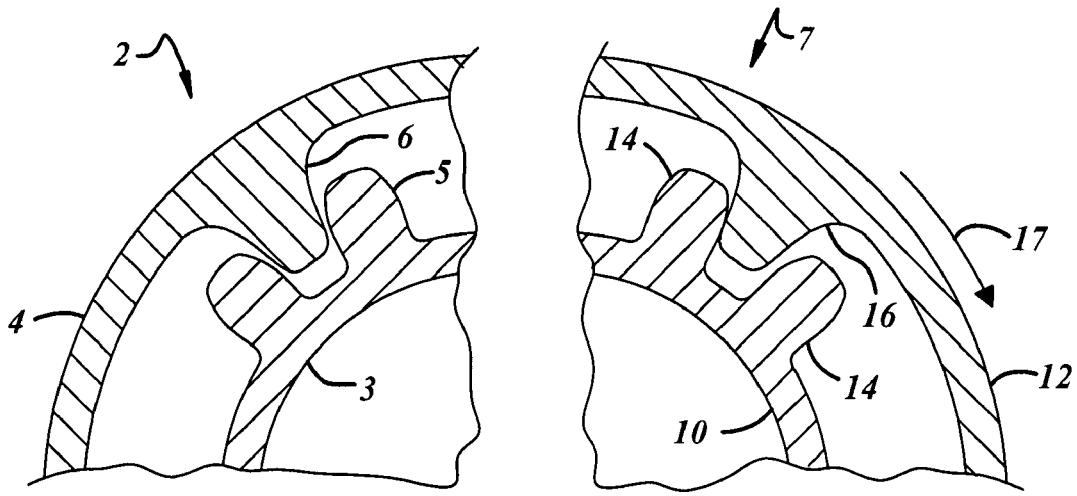
*FIG. 1A*  *FIG. 1B*
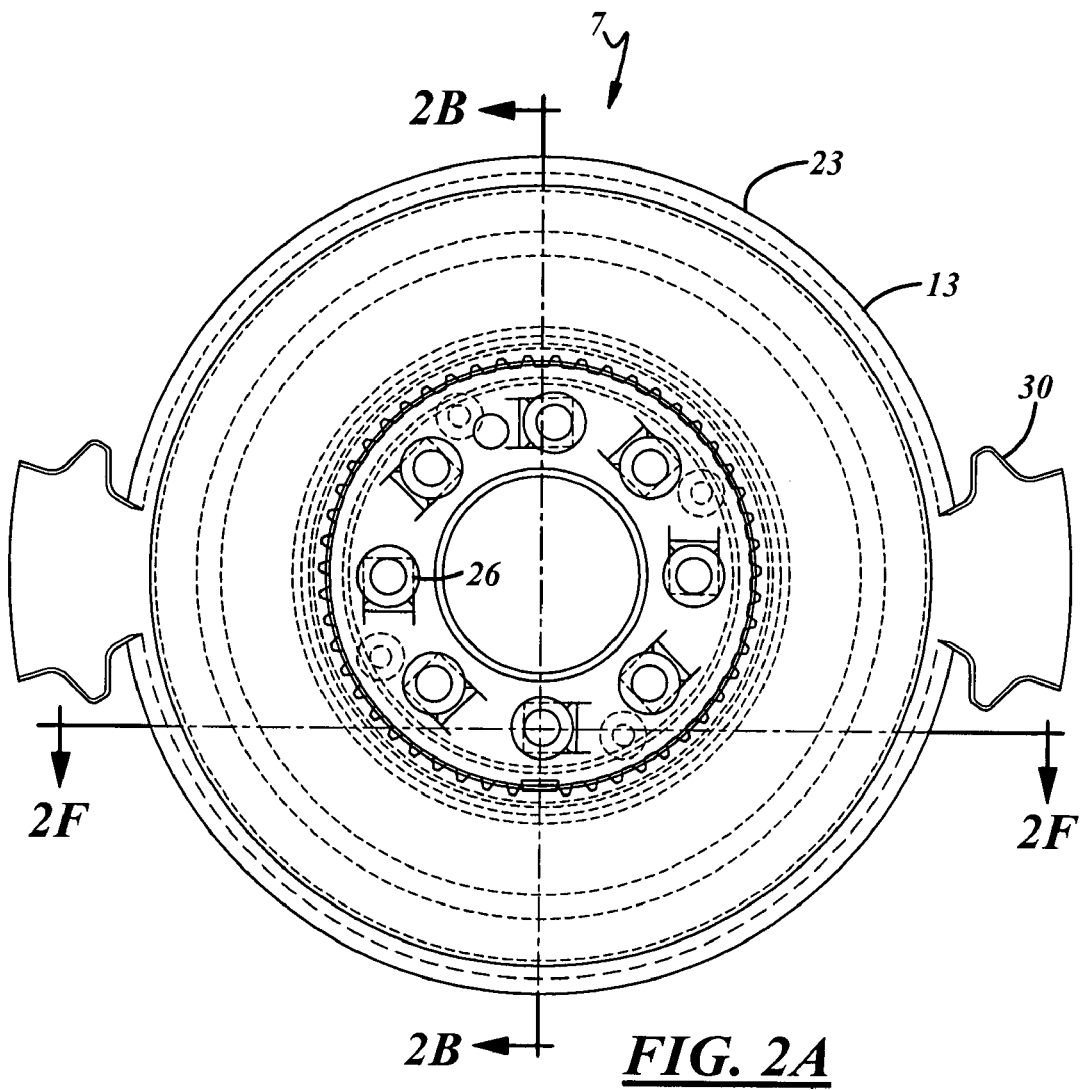
*FIG. 2A*

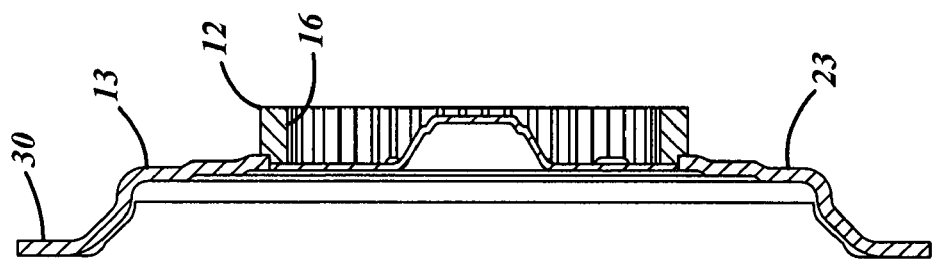
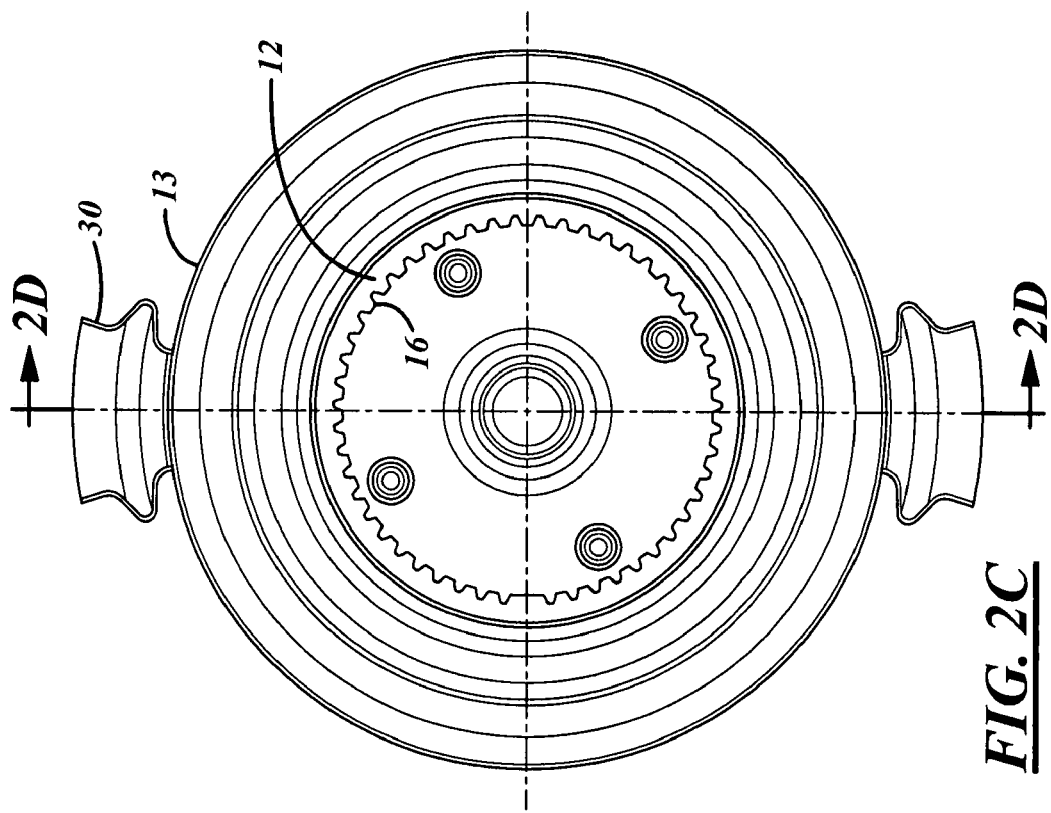
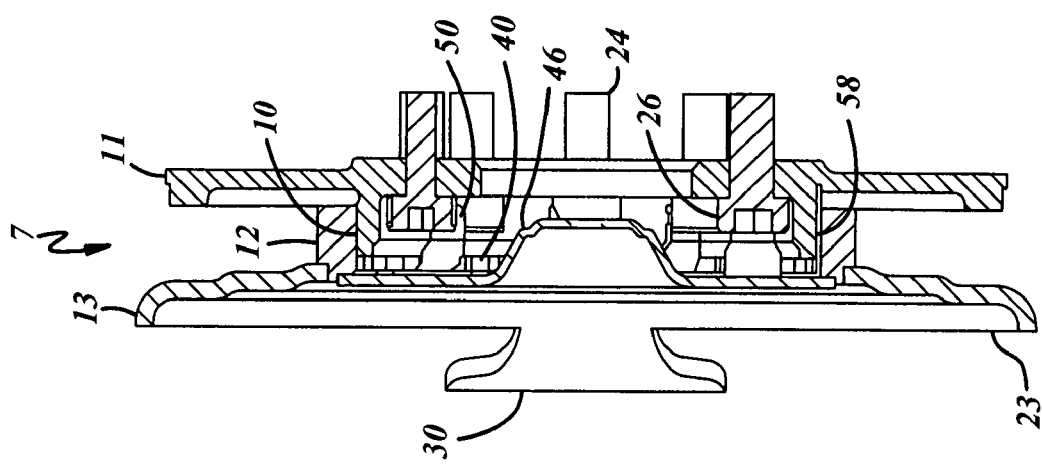

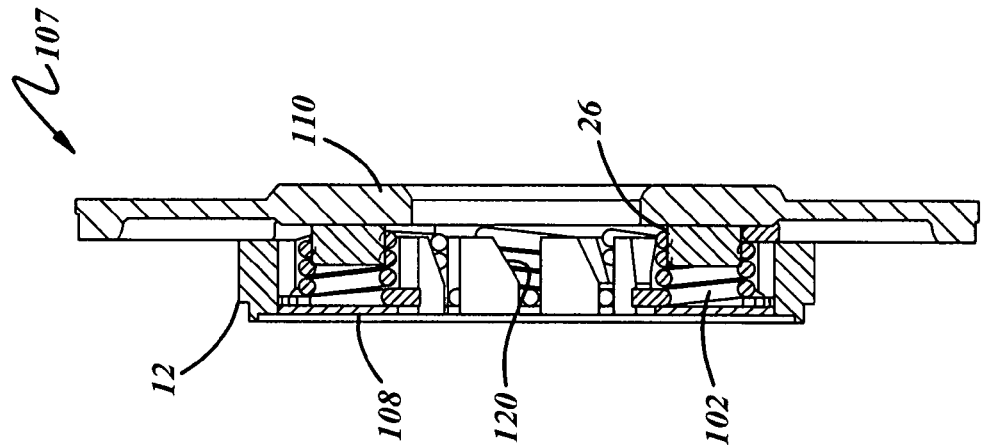
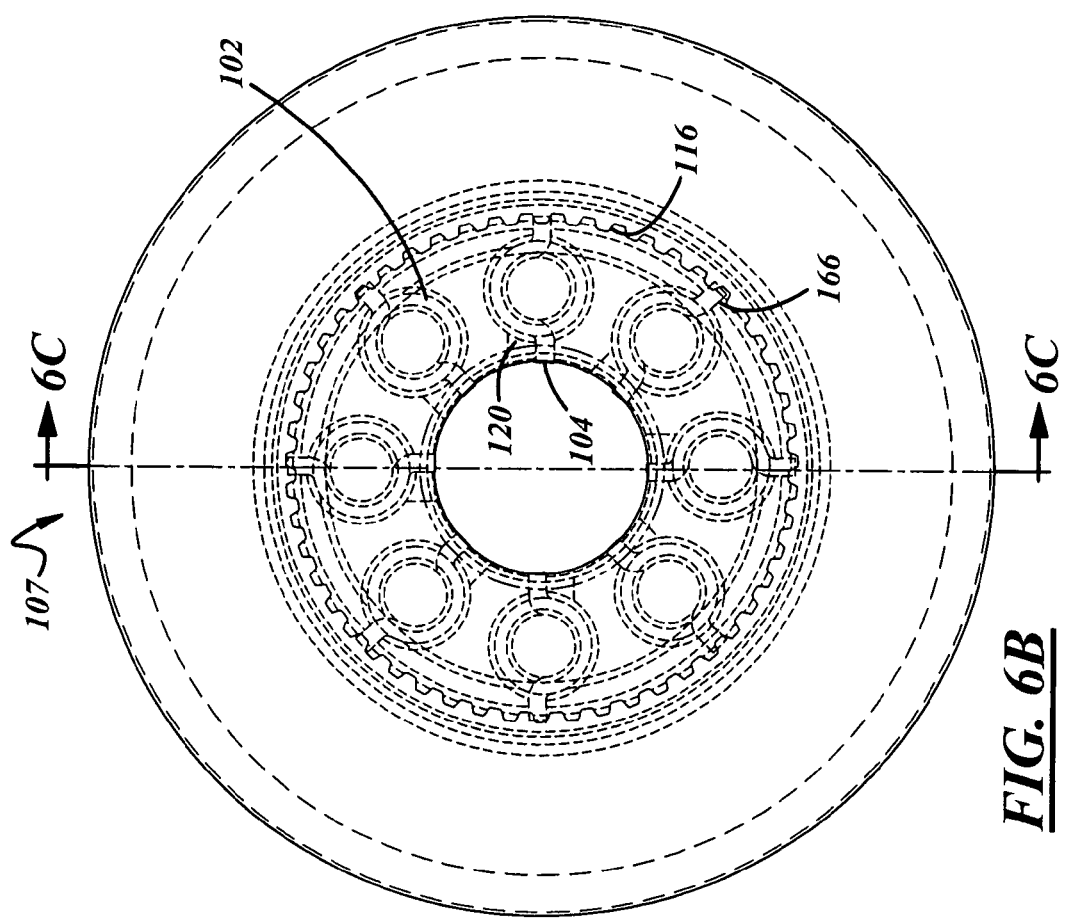

US 7,534,171 B2

SPLINE CONNECTOR

CROSS-REFERENCE TO RELATED APPLICATIONS

This application claims the benefit of U.S. Provisional Application No. 60/809,781, filed May 30, 2006.

FIELD OF THE INVENTION

The present invention relates to spline type torsional connectors between driving and driven members.

BACKGROUND OF THE INVENTION

Spline connectors are typically used to transmit torque from a driving member to a concentric driven member. A spline connector typically will have small torsional force exchange members referred to as teeth or larger torsional force exchange members referred to as lugs. It is common to refer to both types of torsional force exchange members as "spline teeth". Automotive vehicles typically have a spline connector between an output shaft of an engine and an input shaft to a transmission. During startup and shutdown of the engine, torsional vibrations of the engine can cause the spline connector to oscillate, contacting the front and back of the spline teeth in an alternating fashion. In effect, the torque from the engine output becomes negative for a brief instant. This speed and acceleration as to which the oscillation occurs causes impact on the back and front side of the spline teeth causing noise. The reason the impact happens is due to the backlash in the spline teeth design. The spline teeth can be made with no backlash, however it would mean great difficulty in assembling and disassembling the connector. The standard method to fix the oscillation problem is to put a damper between the engine output and the spline input to the transmission. The damper then reduces the amplitude of the negative torque on the spline connector. It is desirable to provide a method and apparatus to further minimize oscillations resulting from negative torque on a spline connector.

SUMMARY OF THE INVENTION

To meet the above noted desire of further minimizing oscillations resulting from negative torque in conjunction with a spline connector, the present invention is brought forth. The present invention provides a spline connector for a torsionally connected driving and driven machine. The spline connector includes driving and driven members. Backlash exists between teeth of the spline connector driving and driven members. A spring biases the teeth of the spline connector driving and driven members to engage with one another in a direction of contact to counteract negative torque of the driving member. The present invention can be used with or without a conventional damper.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a schematic view of a spline connector;

FIG. 1B is a schematic view of a spline connector, according to the present invention;

FIG. 2A is a front plan view of a spline connector, according to the present invention;

FIG. 2B is a sectional view taken along line 2B-2B of FIG. 2A;

FIG. 2C is a front plan view of a female portion of the spline connector shown in FIG. 2A;

FIG. 2D is a sectional view taken along line 2D-2D of FIG. 2C;

FIG. 6B is a rear plan view of the connector of FIG. 6a;

FIG. 6C is a sectional view of the connector shown in FIG. 6B with portions of the connector being removed for clarity of illustration;

DETAILED DESCRIPTION OF THE PREFERRED EMBODIMENTS

Figure 2F:
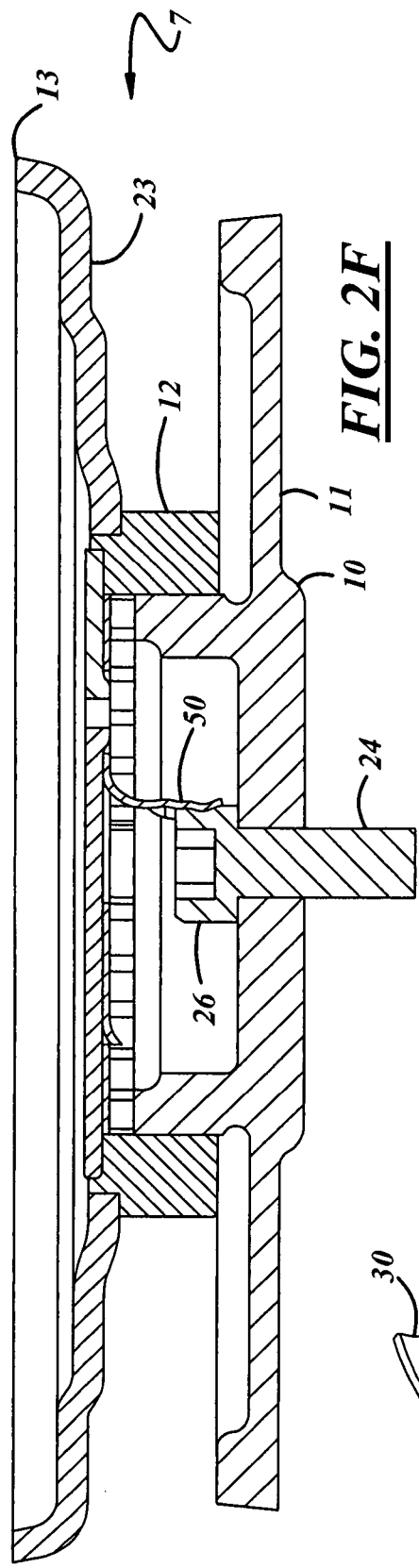
FIG. 2F is a sectional view taken along lines 2F-2F of FIG. 2A.
Figure 3A:
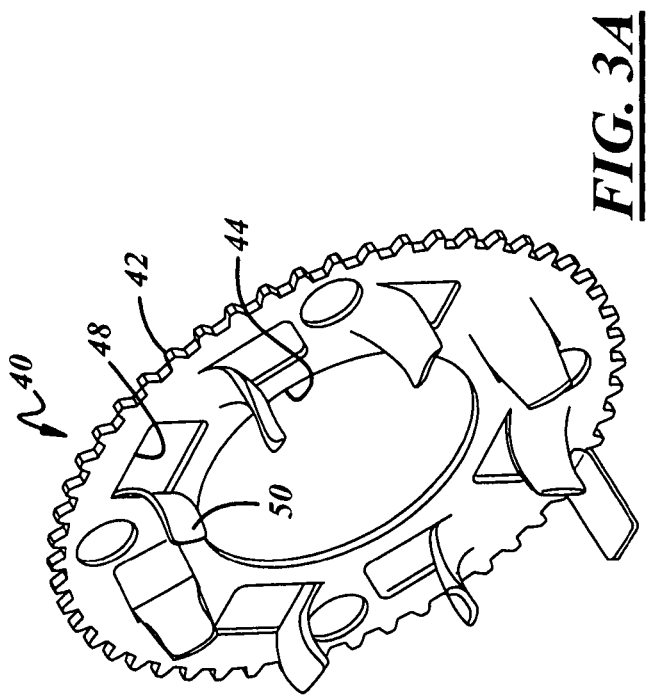
FIG. 3A is a perspective view of the spring plate utilized in the spline connector shown in FIG. 2A.
Figure 2E:
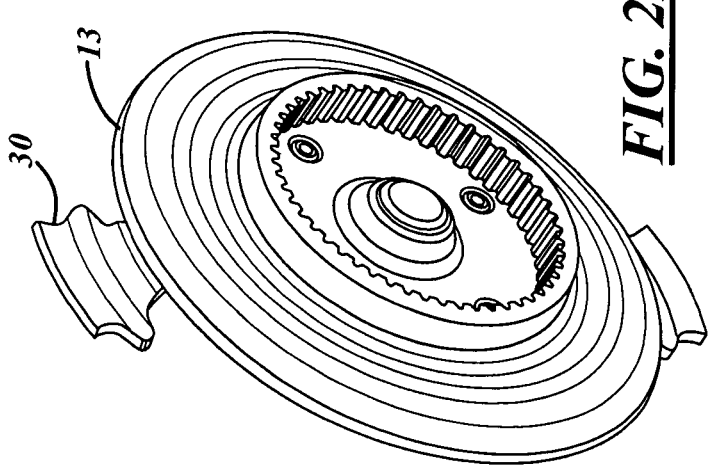
FIG. 2E is a perspective view of the female portion of the spline connector shown in FIG. 2C.

The following description of the preferred embodiment(s) is merely exemplary in nature and is in no way intended to limit the invention, its application, or uses.

FIG. 1A illustrates a spline type coupling or connector 2 having a male spline connector member 3 as a driving member and a female spline connector member 4 as a driven member. In an alternate spline connector application (not shown), the male member can be the driven member. In many applications the male member 3 can be integral with a fly wheel. The male member 3 has torsional force transmission members provided by spline teeth 5 (only two teeth shown) and the female spline connector member 4 has spline teeth 6 (only one tooth shown). Between the teeth 5, 6 there exists a slight clearance or gap commonly referred to as backlash 9 to ease assembly. Negative torque oscillations due to the reciprocal nature of the engine can cause the teeth 5, 6 to move back and forth with respect to each other contacting and causing noise.

Figure 2G:
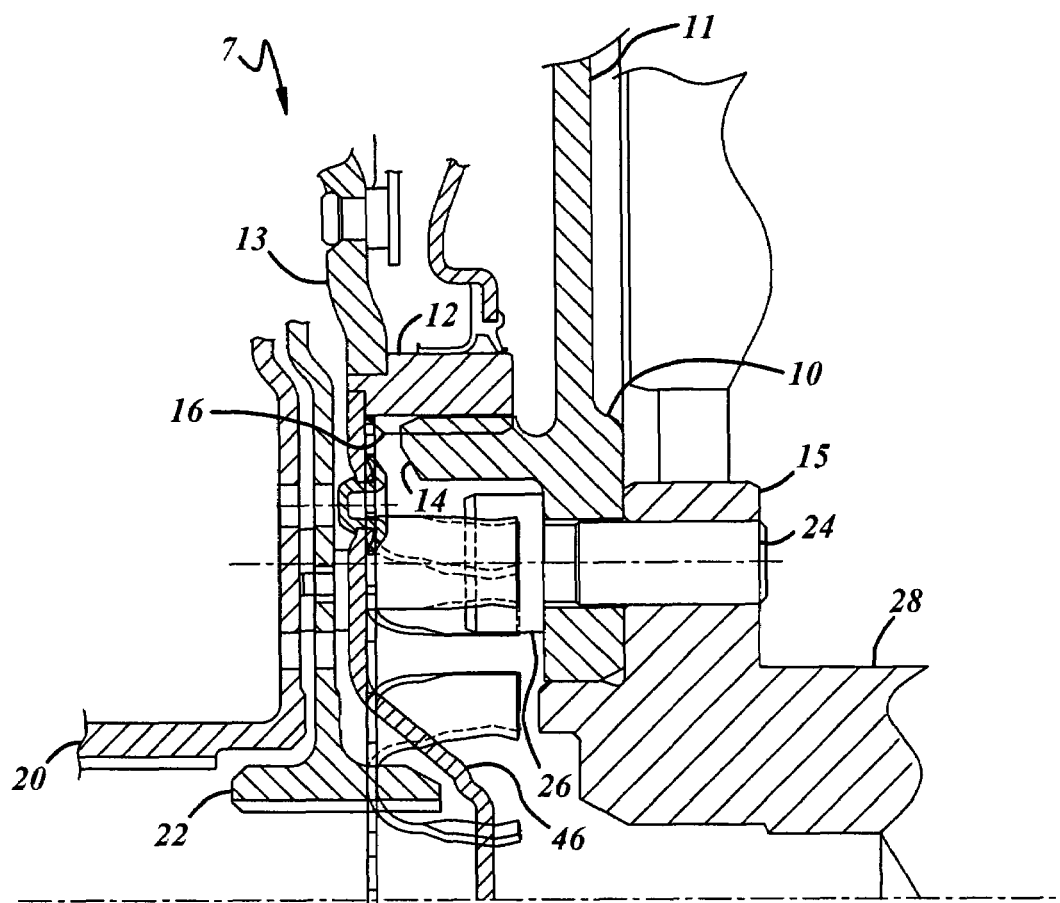
FIG. 2G is an enlarged view of a portion of the spline connector shown in FIG. 2B additionally illustrating portions of the operating environment of the connector.
Figure 3B:
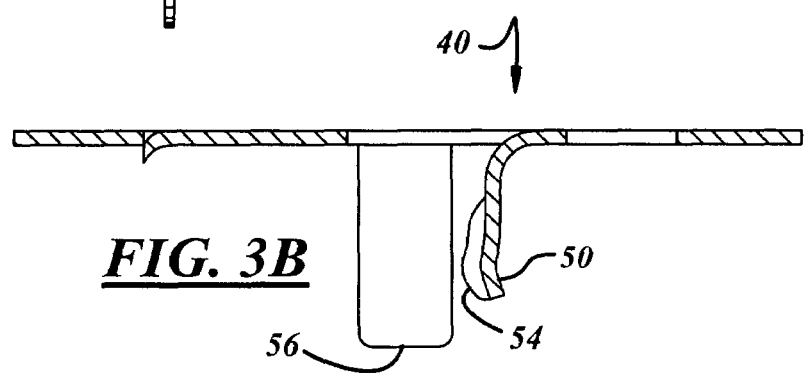
FIG. 3B is a top plan view of the spring plate shown in FIG. 3A.
Figure 3C:
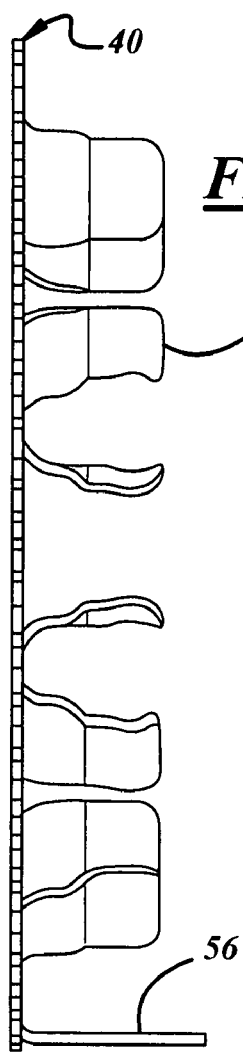
FIG. 3C is a side elevational view of the spring plate shown in FIG. 3A.
Figure 4:
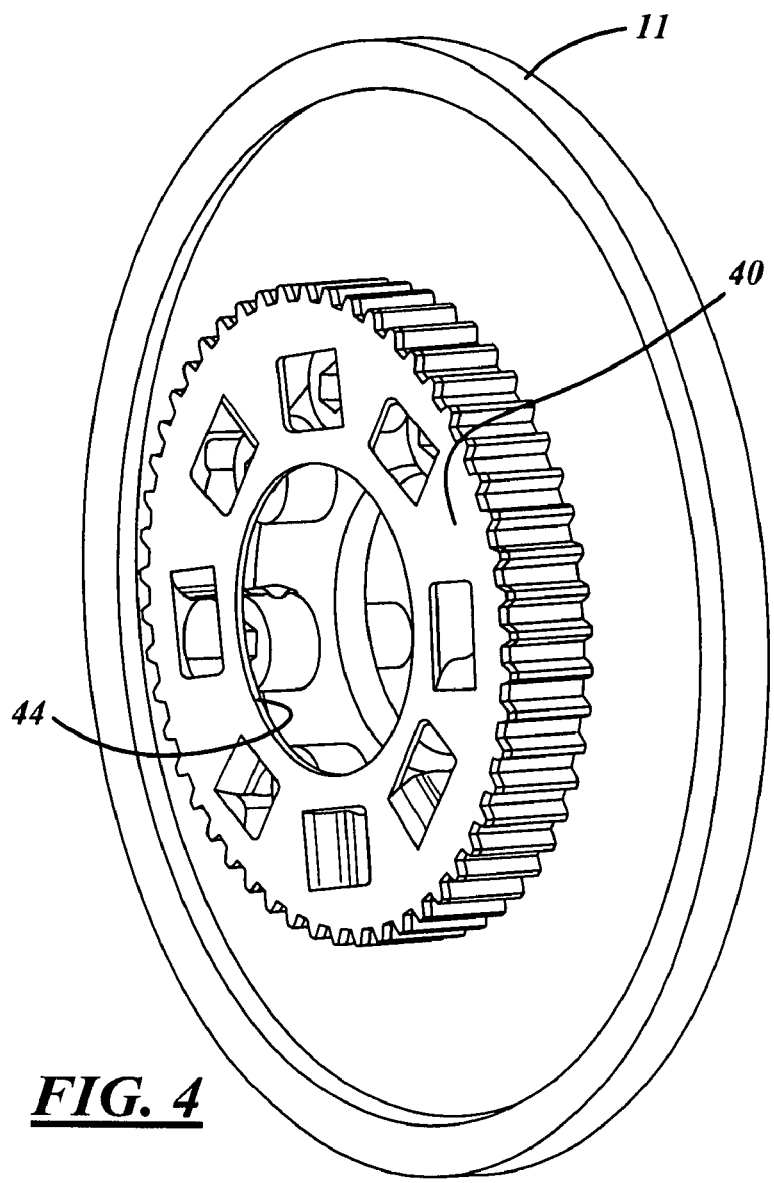
FIG. 4 is a perspective view of portions of the spline connector shown in FIG. 2A looking towards a male member engine side of the connector with major portions of the female member (transmission side) of the connector being removed for clarity of illustration.

FIG. 1B illustrates the spline connector 7 of the present invention with a spring (not shown in FIG. 1B) providing a biasing force forcing engagement between a male tooth 14 with a female tooth 16 under momentary negative torque conditions. The spring preloads the tooth 14 to contact the tooth 16 in the direction of rotation 17. Referring additionally to FIGS. 2A-5, male member 10 is integrated with a fly wheel 11. The male member 10 is connected by a series of bolts 24 having heads 26 with a power source machine such as a motor or engine having an output shaft 28 with a flange 15. A female member 12 is formed as a cylindrical drum with the spline teeth 16 being along its inner surface. The female member cylindrical drum 12 is welded to a plate 23 of a damper 13. In the example shown, the plate 23 is torsionally connected with a clutch housing (not shown) by tabs 30. The clutch housing is torsionally connected with inner and outer input shafts (not shown) of a transmission by splined hubs 20 and 22 (FIG. 2G).

The spline connector 7 also includes a spring plate 40. The spring plate 40 on its outer diameter has a plurality of spline teeth 42. The spline teeth 42 provide for the torsional connection of the spring plate 40 with the female member 12. The spring plate 40 also has a central opening 44. Central opening 44 is fitted over a central hub 46 that is connected with the female member 12. The spring plate 40 has a plurality of cut-outs 48. Formed from the cut-outs 48 are a plurality of spring fingers or tabs 50. The spring tabs 50 have a contour 52 to allow the tabs to partially encircle the bolt heads 26. The spring tabs 50 are also in a circumferential direction having a tapered surface 54. Typically, the male and female members 10, 12 are not axially connected together. The locations of the male and female members 10, 12 are established by the axial location of the engine and transmission which is further established by the connection of the engine and transmission casings together. The mating of the transmission to the engine will cause the bolt heads 26 to engage the spring tabs 50 along the tapered surface 54 and thereby bias the bolt heads 26 in the direction 17 of rotation of the spline connector 7. The spring plate 40 further has a locating tab 56. The locating tab 56 extends along a flattened slot 58 provided between an interface of the male member 10 and female member 12. The locating tab 56 ensures that the spring tabs 50 are in the proper position upon assembly or mating of the transmission with the engine. In operation the spring tab 50 pushes against the bolt heads 26 causing the female member 12 to react in a direction opposite of that of rotation 17. The above noted reaction causes the teeth 16 to be brought into engagement with the teeth 14. The biasing force of the spring tabs 50 urge the teeth 16 in a direction of contact to counteract possible negative torque.

Figure 6A:
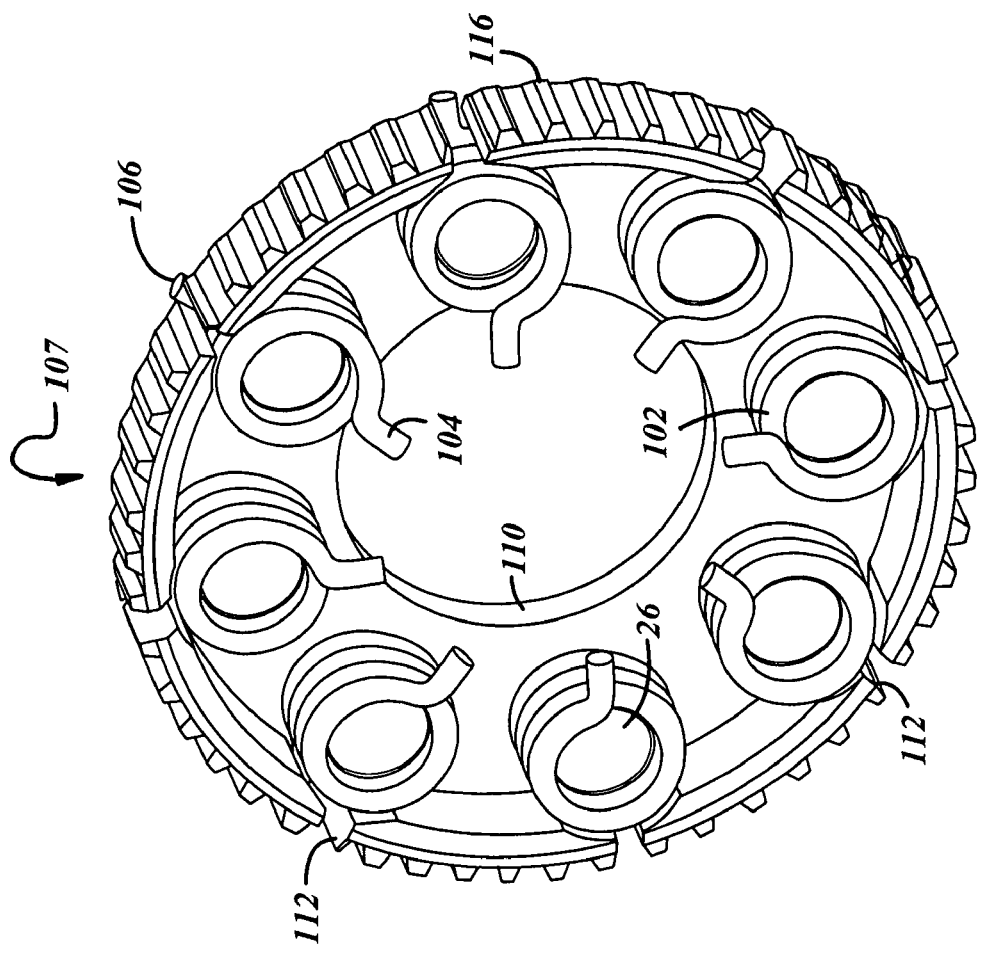
FIG. 6A is a partial perspective view of an alternative embodiment spline connector of the present invention with portions of the male and female members of the connector being removed for clarity of illustration.
Figure 5:
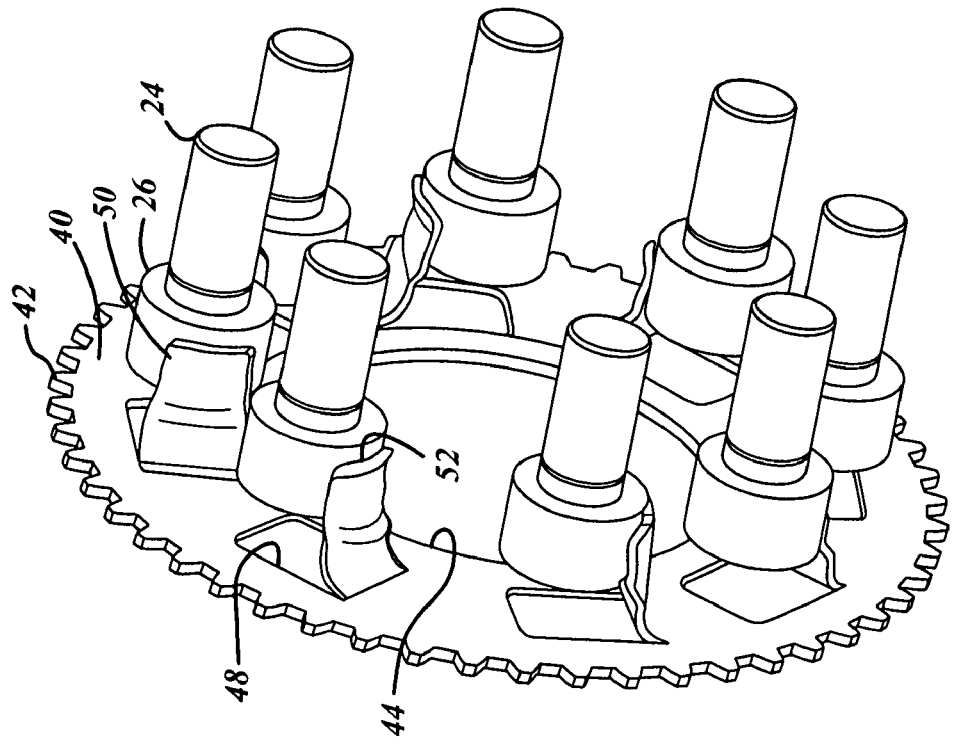
FIG. 5 is a perspective view illustrating placement of the spring plate upon the bolt heads of the male member of the connector with other portions of the male and female members being removed for clarity of illustration.
Figure 7:
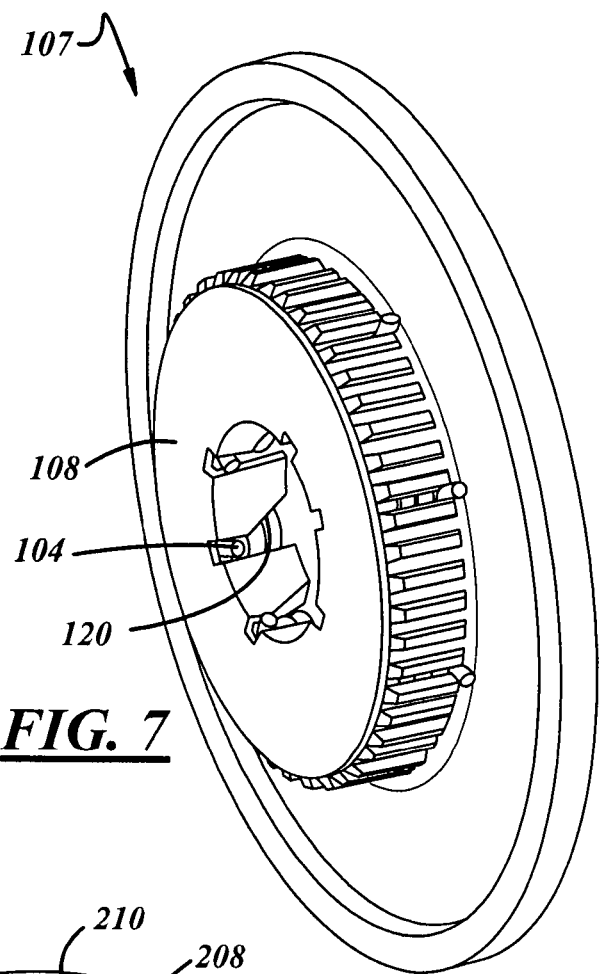
FIG. 7 is a view similar to that of FIG. 6 with portions of the spline connector being removed for clarity of illustration, illustrating placement of an adapter plate upon the male member of the coupler.
Figure 8A:
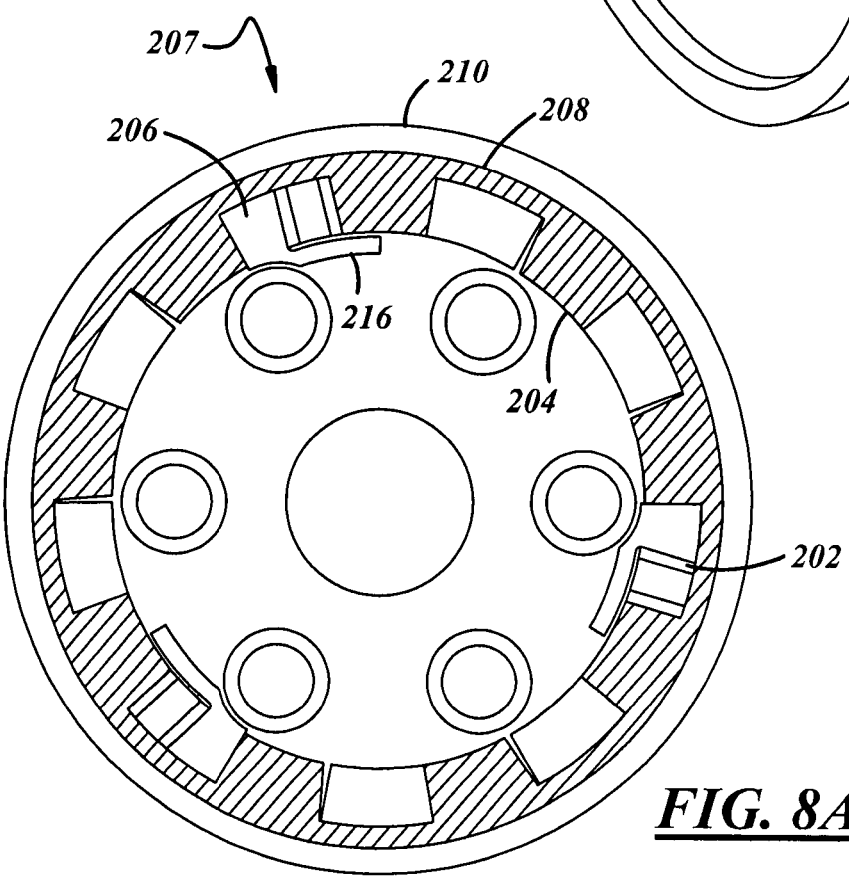
FIG. 8A is a schematic sectional view of yet another embodiment of a spline connector according to the present invention.

Referring additionally to FIGS. 6A-7, an alternate embodiment spline torsional connector 107 of the present invention is provided. In FIG. 6A a radially inner portion of the male connector 110 is partially shown with the fly wheel removed for clarity of the illustration. The male connector 110 is connected to the engine output shaft by a series of bolts having bolt heads 26 as previously explained. The male connector 110 has a series of slots 112 in the cylinder which provides the male teeth 116. A plurality of coil springs 102 are mounted on the bolt heads 26. The springs 102 have legs 104, 106. The coil springs encircle the bolt heads 26 and are carried by the male member 110. The legs 106 are axially closest to the engine output shaft end extend through the slots 112.

FIG. 7 illustrates a portion of an adapter plate 108. The adapter plate 108 is joined to the female member (not shown) by fasteners or a spline connection in a manner as previously explained regarding spring plate 40. The adapter plate 108 has a series of ramps 120 for engagement with the legs 106 of the spring 102. As the transmission and engine are mated, the ramps 120 push against the spring legs 104, torquing the springs 102 and causing the spring leg 106 to present a biasing force against the teeth 116 male member 110.

FIGS. 8A-8D (FIG. 8A being a partially sectioned view) provide a connector 207 having a U shaped flat plate spring 202 captured between two axially extending spline lugs 204, 206 of the driving and driven members 208,210. A pin 212 holds the spring 202 in a retracted or pre-compressed condition until the engine and transmission mate the connector 207. Upon mating the lug 204 knocks the pin 212 into an aperture 214 partially releasing the spring 202. The lug 204 has an extension 216 that radially retains the spring 202 in location.

Figure 9A:
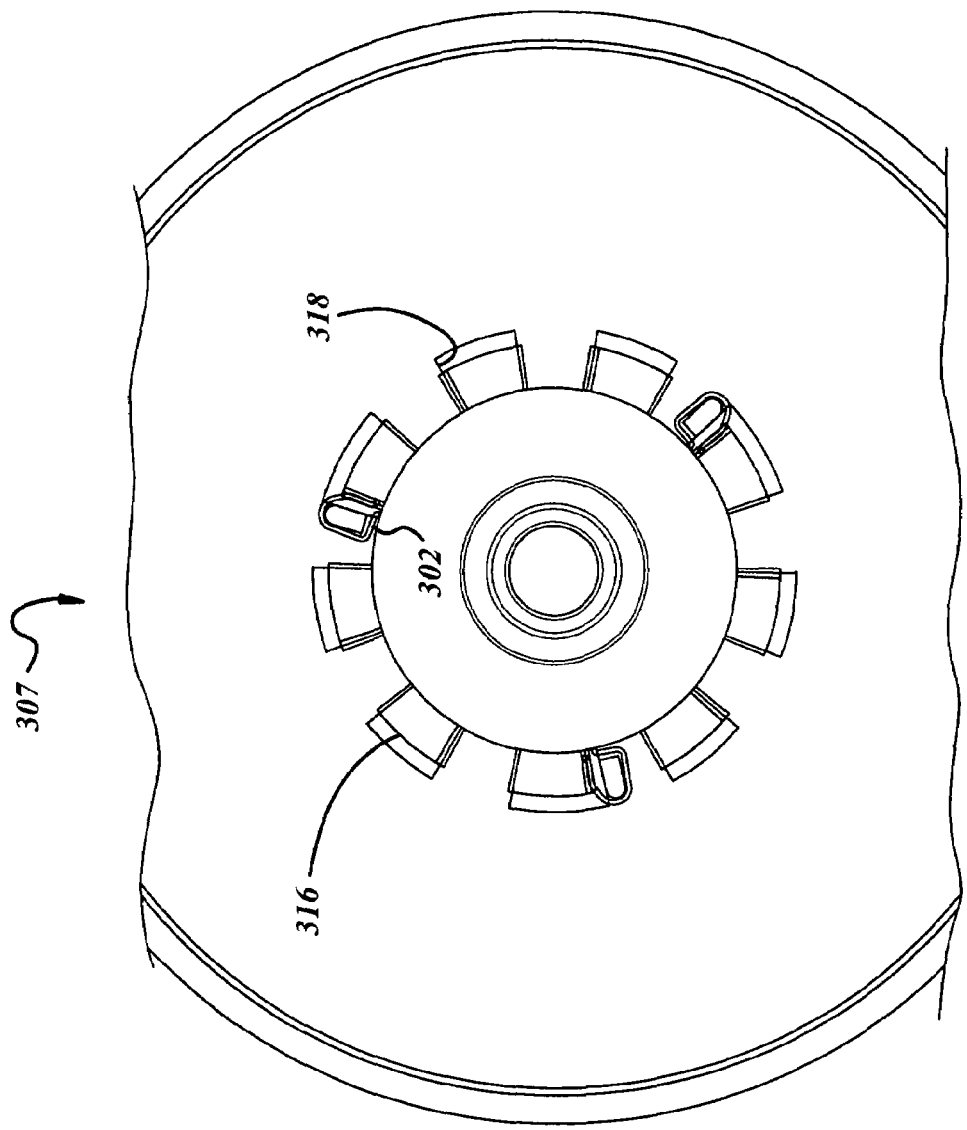
FIG. 9A is a front plan view of yet another spline connector embodiment of the present invention.
Figure 8B:
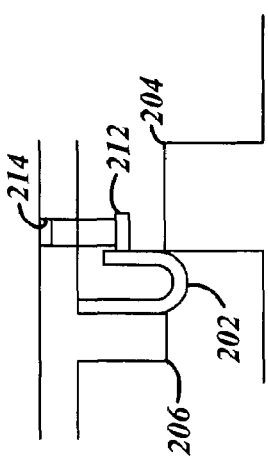
FIG. 8B is a schematic sectional view of a portion of the spline connector shown in FIG. 8A with the connector members being mated.
Figure 8C:
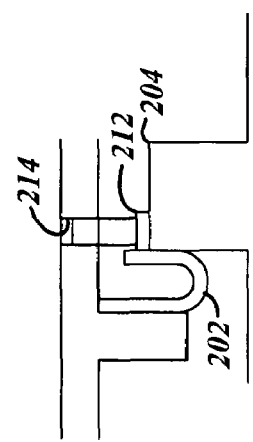
FIG. 8C is a schematic operational view of a portion of the spline connector shown in FIG. 8A in a position subsequent to that of FIG. 8B.
Figure 8D:
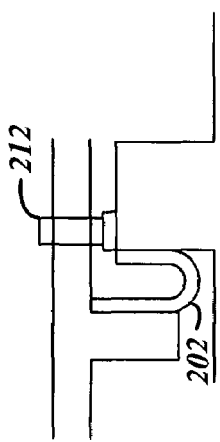
FIG. 8D is a schematic operational view of a portion of the spline connector shown in FIG. 8A wherein the engine and transmission are fully mated.
Figure 9B:
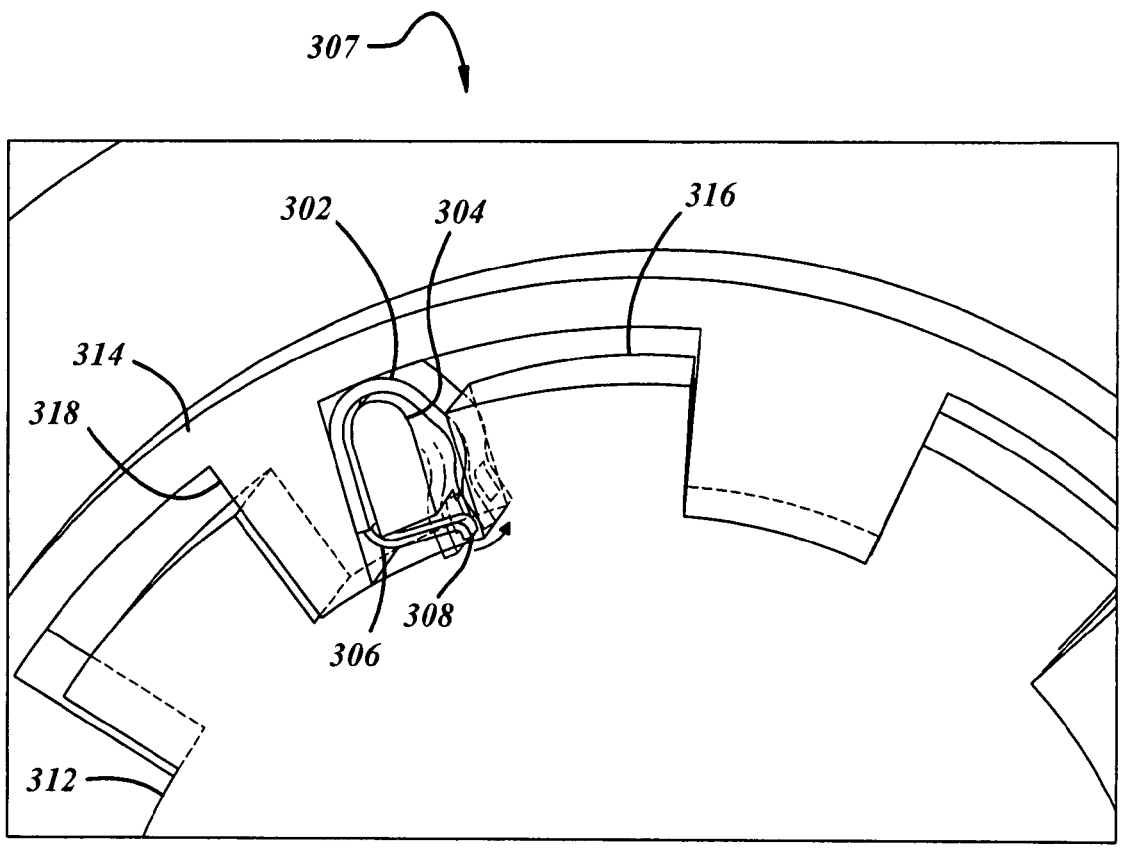
FIG. 9B is an enlargement of a portion of FIG. 9A.
Figure 9C:
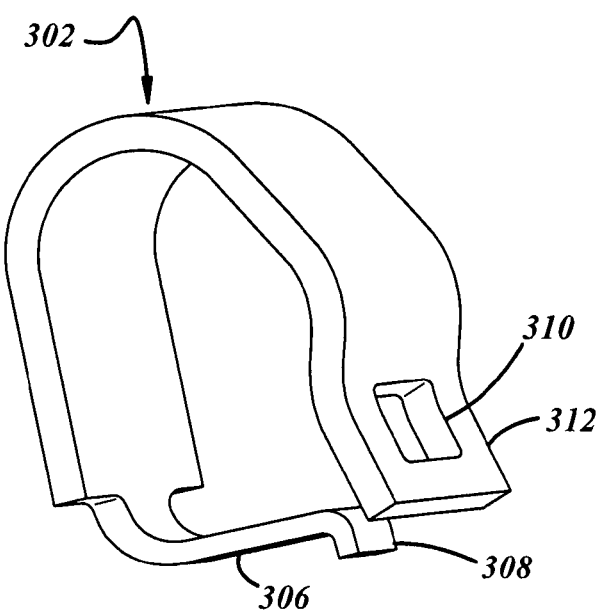
FIG. 9C is an enlargement of a spring utilized in the spline connector shown in FIG. 9A.

FIGS. 9A-9C provide a spline connector 307 with a self-releasing looped U shaped spring 302. The spring is fitted over a special lug 304. The spring 302 has an end with a clip 306 having a hook 308. Before assembly of the connector 307 the hook is fitted within a window 310 of a leg 312 of the spring. Assembly of the driving and driven members 312,314 together causes the hook 308 to be knocked out of the window 310 thereby releasing the biasing force of the spring 302 which is captured between the lugs 316,318 of the driving and driven members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torsional force connector to torsionally connect a power source machine and power driven machine comprising:
   a driving connector member having teeth;
   a driven connector member with teeth having backlash with said teeth of said driving connector member; and
   a plate spline connected with one of said connector members, said plate having a connected spring biasing said teeth of said connector members to engage with one another only in a direction of contact to counteract negative torque of said driving connector member.

2. A connector as described in claim 1 wherein there are a plurality of springs.

3. A connector as described in claim 1 wherein there is no axial connection between said connector members.

4. A connector as described in claim 1 wherein at least one of said connector members is torsionally held to one of said machines with bolts and said spring engages at least one of said bolts.

5. A connector as described in claim 4 wherein said spring is formed by a cut out of said plate.

6. A connector as described in claim 1 wherein said driven member is fixably connected with a damper.

7. A torsional force connector to torsionally connect a power source machine and power driven machine comprising:
    a driving connector member;
    a driven connector member having backlash between teeth of said driving connector members;
    a torsional coilspring biasing said teeth of said connector members to engage with one another only in a direction of contact to counteract negative torque of said driving connector member; and
    a ramp connected on one of said connector members for engaging a leg of said spring.

8. A connector as described in claim 7 wherein there are a plurality of springs.

9. A connector as described in claim 7 wherein said ramp is provided by an adapter plate.

10. A torsional force connector to torsionally connect a power source machine and power driven machine comprising:
    a driving connector member;
    a driven connector member having backlash between teeth of said connector members; and
    a spring biasing said teeth of said connector members to engage with one another only in a direction of contact to counteract negative torque of said driving connector member, said spring being compressed before assembly of said connector and mating of said connector members together causes said spring to be at least partially released by axial movement of a pin.

11. A connector as described in claim 10 wherein there are a plurality of springs.

12. A connector as described in claim 10 wherein said spring is captured between axially extending teeth of said connector members.

13. A torsional force connector to torsionally connect a power source machine and power driven machine comprising:
    a driving connector member;
    a driven connector member having backlash between teeth of said connector members; and
    a spring biasing said teeth of said connector members to engage with one another only in a direction of contact to counteract negative torque of said driving connector member, said spring being compressed before assembly of said connector and mating of said connector members together causes a hook of said spring to be removed from a window of said spring to cause said spring to be at least partially released.

* * * * *